United States Patent
Vormberg et al.

(10) Patent No.: US 7,910,515 B2
(45) Date of Patent: *Mar. 22, 2011

(54) PHOTOCATALYST

(75) Inventors: Reinhard Vormberg, Neuberg (DE); Kai Schumacher, Hofheim (DE)

(73) Assignee: Evonik Degussa GmbH, Duesseldorf (DE)

(*) Notice: Subject to any disclaimer, the term of this patent is extended or adjusted under 35 U.S.C. 154(b) by 456 days.

This patent is subject to a terminal disclaimer.

(21) Appl. No.: 11/995,939

(22) PCT Filed: Jul. 6, 2006

(86) PCT No.: PCT/EP2006/063975
§ 371 (c)(1), (2), (4) Date: Jan. 17, 2008

(87) PCT Pub. No.: WO2007/017326
PCT Pub. Date: Feb. 15, 2007

(65) Prior Publication Data
US 2010/0120609 A1    May 13, 2010

(30) Foreign Application Priority Data
Aug. 9, 2005   (EP) .................................. 05017264

(51) Int. Cl.
B01J 21/00    (2006.01)
B01J 23/00    (2006.01)
C01B 33/12    (2006.01)
C01G 23/047   (2006.01)
C09C 1/36     (2006.01)

(52) U.S. Cl. ........ 502/242; 502/350; 423/336; 423/611; 423/612; 423/613; 106/436

(58) Field of Classification Search ................. 502/242, 502/350; 423/336, 611–613; 106/436
See application file for complete search history.

(56) References Cited

U.S. PATENT DOCUMENTS

| | | | |
|---|---|---|---|
| 5,451,390 A | 9/1995 | Hartmann et al. | |
| 5,698,177 A | 12/1997 | Pratsinis et al. | |
| 5,935,895 A * | 8/1999 | Baiker et al. | 502/349 |
| 6,572,964 B2 * | 6/2003 | Tanaka et al. | 428/328 |
| 6,770,130 B2 * | 8/2004 | Kato et al. | 106/481 |
| 6,849,114 B2 * | 2/2005 | Oswald et al. | 106/286.4 |
| 7,244,302 B2 * | 7/2007 | Schumacher et al. | 106/446 |
| 7,306,667 B2 * | 12/2007 | Schumacher et al. | 106/446 |
| 7,347,986 B2 * | 3/2008 | Ishii et al. | 424/59 |
| 7,416,600 B2 * | 8/2008 | Schumacher et al. | 106/446 |
| 2002/0114761 A1 | 8/2002 | Akhtar et al. | |
| 2003/0129153 A1 | 7/2003 | Moerters et al. | |
| 2003/0134128 A1 * | 7/2003 | Oswald et al. | 428/446 |
| 2006/0144296 A1 * | 7/2006 | Meyer et al. | 106/436 |
| 2006/0147366 A1 * | 7/2006 | Kogoi et al. | 423/326 |
| 2006/0159635 A1 * | 7/2006 | Meyer et al. | 424/59 |

FOREIGN PATENT DOCUMENTS

| | | |
|---|---|---|
| DE | 10 2004 001520 | 8/2005 |
| GB | 791 657 | 3/1958 |
| WO | 2004 056927 | 7/2004 |

* cited by examiner

*Primary Examiner* — Patricia L Hailey
(74) *Attorney, Agent, or Firm* — Oblon, Spivak, McClelland, Maier & Neustadt, L.L.P.

(57) ABSTRACT

Silicon titanium mixed oxide powder having the following features:
  BET surface area of 5 to 300 m$^2$/g,
  silica content, based on the total amount of the mixed oxide powder, of $\geq 0.1$ to $<0.5\%$ by weight,
  titanium dioxide content, based on the total amount of the mixed oxide powder, of $\geq 99.0\%$ by weight,
  sum of the proportions of silica and titanium dioxide, based on the total amount of the mixed oxide powder, $\geq 99.5\%$ by weight,
titanium dioxide content of the primary particles comprising intergrown rutile and anatase phases,
silica content of the primary particles amorphous, is prepared by allowing the vapours of one or more, in each case oxidizable and/or hydrolyzable titanium and silicon compounds to react in a high temperature zone with oxygen and/or steam, cooling the reaction mixture after the reaction and separating off the pulverulent solid from gaseous substances.

20 Claims, No Drawings

PHOTOCATALYST

The invention relates to a silicon titanium mixed oxide powder, the preparation thereof and the use thereof as a photocatalyst. The invention furthermore relates to a dispersion which contains the silicon titanium mixed oxide powder, and a substrate coated with the silicon titanium mixed oxide powder.

EP-A-778812 discloses titanium dioxide mixed oxide particles which are produced by reaction of titanium tetrachloride and a chloride of silicon, germanium, boron, tin, niobium, chromium, aluminium, gold, silver or palladium in a flame and are intended for photocatalytic use. Of particular importance are silicon and aluminium titanium mixed oxide particles. It is disclosed that such mixed oxide powders having a content of about 5 to 10% by weight of silica are not optimum for photocatalytic purposes. Furthermore, it is mentioned that the anatase content and hence the photocatalytic activity in such mixed oxide powders increase with increasing proportion of silica. From these statements, it is to be concluded that the photocatalytic activity occurs to a marked extent only for a proportion of 10% of silica.

DE-A-10260718 discloses silica-coated titanium dioxide particles having a silica content of 0.5 to 40% by weight. The particles have a low photocatalytic activity and are therefore preferably used in sunscreen formulations.

DE-A-4235996 describes silicon titanium mixed oxide particles having a silica content of 1 to 30% by weight, based on the mixed oxide. The mixed oxide has high thermal stability, but the silica content reduces the photocatalytic activity.

WO03/037994 discloses titanium dioxide particles coated with oxides of silicon, aluminium, cerium and/or zirconium. The coating leads to effective protection from photocatalytic reactions. The particles are obtained by precipitating a precursor of silica in the presence of a surface-modifying substance onto titanium dioxide particles and, if appropriate, effecting hydrothermal aftertreatment. The proportion of silica, based on titanium dioxide, is 0.1 to 10% by weight. A marked reduction in the photocatalytic activity is observed from as little as 0.1% by weight.

EP-A-988853 and EP-A-1284277 disclose silica-coated titanium dioxide particles in which a silica coating leads to a reduction in the photocatalytic activity. The particles are therefore used mainly in sunscreen formulations.

The technical teaching which the prior art imparts is that proportions of silica in silicon titanium mixed oxide powders lead to a reduction in the photocatalytic activity.

It was the object of the present invention to increase the photocatalytic activity of a titanium dioxide-based powder.

The invention relates to a silicon titanium mixed oxide powder which has the following features:

BET surface area of 5 to 300 $m^2/g$,
silica content, based on the total amount of the mixed oxide powder, of $\geqq 0.1$ to <0.5% by weight,
titanium dioxide content, based on the total amount of the mixed oxide powder, of $\geqq 99.0\%$ by weight,
sum of the proportions of silica and titanium dioxide, based on the total amount of the mixed oxide powder, $\geqq 99.5\%$ by weight,
titanium dioxide content of the primary particles comprising intergrown rutile and anatase phases,
silica content of the primary particles amorphous.

The BET surface area of the powder according to the invention is determined according to DIN 66131. In a preferred range, the mixed oxide powder according to the invention has a BET surface area of 30 to 120 $m^2/g$.

Mixed oxide is to be understood as meaning the presence of Si—O—Ti bonds which are formed as a result of thorough mixing of titanium dioxide and silica at the atomic level. In addition, the primary particles may also have regions of silica in addition to titanium dioxide. Furthermore, individual primary particles may consist completely of titanium dioxide or silica.

Primary particles are to be understood as meaning the smallest particles which cannot be further divided without breaking chemical bonds. These primary particles can grow to form aggregates. Aggregates are distinguished by the fact that their surface area is smaller than the sum of the surface areas of the primary particles of which they consist. Powders according to the invention which have a small BET surface area may be present completely or predominantly in the form of non-aggregated primary particles, while powders according to the invention which have a high BET surface area have a higher degree of aggregation or may be present in the completely aggregated form. The primary particles of the mixed oxide powder according to the invention have no internal surface area.

By counting from TEM images (TEM=transmission electron microscopy) in combination with EDX (energy dispersive X-ray analysis), it is found that primary particles having Si—O—Ti bonds are present in a proportion of at least 80%, based on the total amount of the titanium mixed oxide. As a rule, the proportion is more than 90%, in particular more than 95%.

The sum of the proportions of silica and titanium dioxide in the mixed oxide powder according to the invention is at least 99.5% by weight, based on the total amount of the mixed oxide powder. In addition, the silicon titanium mixed oxide powder may have traces of impurities from the starting materials, as well as impurities produced by the process. These impurities may amount to at most up to 0.5% by weight, but as a rule not more than 0.3% by weight.

The silica content, based on the total amount of the mixed oxide powder according to the invention is from $\geqq 0.1$ to <0.5% by weight. Silica contents of less than 0.1% by weight show a comparable photo activity to a sample which has the features of the powder according to the invention but without silica. A declining photo activity is to be expected even at silica contents of more than 0.5% by weight.

The crystalline rutile and anatase contents in the mixed oxide powder according to the invention can absorb light quanta, with the result that an electron is promoted from the valence band into the conduction band. In the case of rutile, the distance between valence band and conduction band is 3.05 eV, corresponding to an absorption of 415 nm; in the case of anatase, the distance is 3.20 eV, corresponding to an absorption of 385 nm. If the free electrons migrate to the surface they may initiate a photocatalytic reaction there.

In the mixed oxide powder according to the invention, primary particles which have the rutile and anatase phase are present. This feature is important for the mixed oxide powder according to the invention in order to achieve high photocatalytic activity. A possible cause of this effect might be that the quanta trapped by the rutile content are passed on to the anatase part, with the result that the probability of generating reactive electrons at the surface increases.

Preferably, anatase is the main component. In particular, a rutile/anatase ratio in the range of 30/70 to 5/95 is particularly preferred.

The silicon titanium mixed oxide powder according to the invention may have a variety of structures. Thus, it can be present in aggregated form, or individual, non-aggregated primary particles may be present. The silica content may be distributed randomly over the primary particles or may be arranged in the form of a coating around the titanium dioxide core. If the mixed oxide powder according to the invention is present in aggregated form, it has proved to be particularly advantageous if the primary particles are intergrown via their silica coat.

The invention furthermore relates to a process for the preparation of the silicon titanium mixed oxide powder according to the invention in which the vapours of one or more, in each case oxidizable and/or hydrolyzable titanium and silicon compounds, corresponding to a proportion of silica of $\geqq 0.1$ to $<0.5\%$ by weight and of titanium dioxide of $\geqq 99.0\%$ by weight, based in each case on the total amount of the mixed oxide powder, are transferred, separately or together, into a mixing chamber and then allowed to react in a reaction space in a high temperature zone with oxygen and/or steam, the reaction mixture is cooled after the reaction and the pulverulent solid is separated off from gaseous substances.

In a preferred embodiment of the invention, the high temperature zone is formed by a flame which originates from the reaction of an oxygen-containing gas with a hydrogen-containing combustion gas. Especially air (primary air) and oxygen-enriched air are suitable as the oxygen-containing gas. Especially hydrogen, methane, ethane, propane, butane and/ or natural gas are suitable as combustion gases. The manner in which the flame temperature can be varied is known to the person skilled in the art. The composition of the flame is preferably chosen so that the high temperature zone has a temperature of 900 to 1600 K.

Flame types which are suitable for carrying out the process according to the invention, such as, for example, laminar or turbulent flames, premixed flames or diffusion flames, low-pressure or high-pressure flames, flames having a propagation, below, at or above the speed of sound, pulsating or continuous flames, external flames, reducing or oxidizing flames, secondary flames, closed flames or open flames, externally heated or externally cooled flames, flames from one or more burners or a mixed form of the abovementioned flame types, are furthermore known to the person skilled in the art.

The hydrolyzable and/or oxidizable titanium compound used in the process according to the invention may be an organometallic or inorganic compound. Suitable organometallic compounds may be titanium alkoxides or titanium carboxylates. However, inorganic compounds, in particular $TiCl_4$, are preferred.

The hydrolyzable and/or oxidizable compound used in the process according to the invention may be an organometallic or inorganic compound. Suitable compounds may be $CH_3SiCl_3$, $(CH_3)_2SiCl_2$, $(CH_3)_3SiCl$, $(CH_3)_4Si$, $HSiCl_3$, $(CH_3)_2HSiCl$, $CH_3C_2H_5SiCl_2$, $SiCl_4$ and mixtures thereof. $SiCl_4$ is preferred.

Preferably, the titanium compound and the silicon compound are vaporized at temperatures of 200° C. or less, the vapours are mixed with a hydrogen-containing combustion gas and air or oxygen-enriched air, and the mixture is ignited and allowed to burn into the reaction space.

The process according to the invention can furthermore be carried out in such a way that an oxygen-containing gas is additionally fed into the reaction space at one or more points.

The invention furthermore relates to a dispersion which contains the silicon titanium mixed oxide powder according to the invention. The liquid phase of the dispersion may be water and/or an organic solvent or solvent mixture. The content of the silicon titanium mixed oxide powder according to the invention in the dispersion may be up to 70% by weight.

The dispersion may furthermore contain additives known to the person skilled in the art for adjusting the pH and surface-active substances. The preparation of the dispersion can be carried out using the known dispersing units. Dissolvers, ultrasound and rotor-stator machines are particularly suitable.

The invention furthermore relates to a coated substrate in which the silicon titanium mixed oxide powder according to the invention is part of the coating, or the substrate is completely coated with the powder according to the invention. The coated substrate can be obtained by applying a dispersion which contains the silicon titanium mixed oxide powder according to the invention to a substrate, for example glass or a polymer, and then subjecting it to a thermal treatment. The application of the dispersion can be effected by dip coating, brushing, spraying and/or knife coating. The thermal treatment can be effected, for example, by heating in an oven, flame sintering and/or laser sintering.

The invention furthermore relates to the use of the silicon titanium mixed oxide powder according to the invention, a dispersion therewith or a substrate coated with the silicon titanium mixed oxide powder according to the invention as a photocatalyst.

EXAMPLES

A. Preparation of the Powders

Example 1

4.1 kg/h of $TiCl_4$ and 0.05 kg/h of $SiCl_4$ are vaporized. The vapours are mixed by means of nitrogen together with 2.0 m³ (STP)/h of hydrogen and 9.1 m³ (STP)/h of dried air in the mixing chamber of a burner of known design, and are fed via a central tube, at the end of which the reaction mixture is ignited, to a water-cooled flame tube and are combusted there.

The resulting powder is then separated off in a filter. By treatment of the powder with moist air at about 500-700° C., adhering chloride is removed.

Example 2 is carried out analogously to example 1. The batch sizes and the experimental conditions of examples 1 and 2 are reproduced in table 1, and the physicochemical properties of the powders are reproduced in table 2.

TEM evaluations of the powders of examples 1 and 2 show predominantly aggregated powders having complete silica coats and a titanium dioxide core.

Powders 3 and 4 are titanium dioxide powders prepared by flame hydrolysis from $TiCl_4$.

B. Photocatalytic Activity

The silicon titanium mixed oxide powders according to the invention, of examples 1 and 2, and the titanium dioxide powders 3 and 4 as comparative samples are investigated with regard to their photocatalytic activity with respect to fatty acid degradation.

The test substance used is stearic acid methyl ester (methyl stearate for short), dissolved in n-hexane. Since, for the activity tests, this substance is applied as a thin fat film to the surface to be tested, a layer is first produced on the substrate material glass from the powders 1 to 4.

For this purpose, a dispersion of 120 mg each of powders 1 to 4 in 2 ml of isopropanol is prepared and is applied to a glass surface of 4×9 cm. The coats are then heated at 100° C. for 60 min in a muffle furnace.

A defined amount of a methyl stearate solution (5 mmol/l) in n-hexane is applied to the coats obtained, and these are exposed initially for 15 minutes to 1.0 mW/cm² UV-A light.

For the determination, about 500 μl each of a methyl stearate solution (5 mmol/l) in n-hexane are applied to the mixed oxide coats so that, based on the wash-off amount (5 ml of n-hexane), a concentration of about 0.5 mmol/l results. The values determined by means of gas chromatography (FID) are shown in table 3.

After the end of the exposure, the methyl stearate remaining on the mixed oxide coats is washed off with 5 ml of n-hexane and quantitatively determined with the aid of gas chromatography (FID).

The comparison with a previously determined reference value, determined by applying the defined amount of methyl stearate and immediately washing off the methyl-stearate coat with n-hexane without prior exposure, provides information about the photocatalytic activity of the coats.

Table 3 shows the remaining amount of methyl stearate on the $TiO_2$ coats after exposure for 5 min to 1.0 mW/cm² UV-A light.

As a reference or control experiment, powder 2 according to the invention was used as an example in a "dark experiment" for the degradation of methyl stearate.

After application of 500 μl of the (methyl stearate in n-hexane) solution, the coats are stored in darkness for 1 hour. Thereafter, the coats are washed off with 5 ml of n-hexane and the methyl stearate concentration is determined with the aid of gas chromatography. The degradation rate is negligible at 14 μM/h.

The determination of the photon efficiency is associated with an error of not more than 10%. Thus, the deviation of the dark experiment value for the initial concentration (reference value) is within the accuracy of measurement. Consequently, the degradation rate can be converted directly into the corresponding photon efficiencies. The initial degradation rates of the individual samples, i.e. in each case the rates determined after the shortest exposure time are the basis of the calculation.

Calculation of the photon efficiency for example 3:
Photon flux at 350 nm, 36 cm² exposed area and 1.0 mW/cm²: $3.78 \cdot 10^{-4}$ mol·hv·h⁻¹
Analysed volume: 5 ml=0.005 l
Degradation rate: 1520 μM/h·0.005 l=$7.6 \cdot 10^{-6}$ mol·h⁻¹
Photon efficiency=degradation rate·photon flux
Photon efficiency=$7.6 \cdot 10^{-6}$ mol·h⁻¹·$3.78 \cdot 10^{-4}$ mol·hv·h⁻¹=$2.01 \times 10^{-2}$=2.01%

The calculation of the photon efficiency of the powders of examples 1, 2 and 4 is effected analogously. The results are reproduced in table 2.

The results show that the photocatalytic activity of the silicon titanium mixed oxide powders according to the invention is higher than in the case of titanium dioxide powders with comparable features and a comparable preparation process.

TABLE 1

Experimental conditions in the preparation of powders 1 and 2 according to the invention

| Example | | 1 | 2 |
|---|---|---|---|
| $TiCl_4$ | kg/h | 4.1 | 4.1 |
| $SiCl_4$ | kg/h | 0.05 | 0.05 |
| $H_2$ | m³ (STP)/h | 2.0 | 2.0 |
| Air | m³ (STP)/h | 9.1 | 14.0 |
| Secondary air | m³ (STP)/h | 15 | 15 |

TABLE 2

Analytical data of powders 1 to 4

| Example | | According to the invention | | Comparison | |
|---|---|---|---|---|---|
| | | 1 | 2 | 3 | 4 |
| $TiO_2$ content | % by wt | 99.41 | 99.46 | >99.5 | >99.5 |
| $SiO_2$ content | % by wt | 0.41 | 0.45 | <0.002 | <0.002 |
| BET | m²/g | 48 | 83 | 50 | 90 |
| Rutile/anatase | | 39/61 | 24/76 | 20/80 | 10/90 |
| Photon efficiency | % | 3.3 | 5.2 | 2.01 | 4.4 |
| Photo activity *) | | 1.64 | 2.59 | 1 | 2.19 |

*) based on Aeroxide ® $TiO_2$ P25, Degussa = 1;

TABLE 3

Degradation rates of methyl stearate

| Example | | 1 | 2 | 3 | 4 |
|---|---|---|---|---|---|
| $c_0$ methyl stearate | mmol/l | 0.46 | 0.48 | 0.43 | 0.4 |
| $c_{5\,min}$ methyl stearate | mmol/l | 0.27 | 0.13 | 0.05*) | 0.12 |
| Degradation rate for methyl stearate | μmol/ l × h | 2520 | 3960 | 1520 | 3360 |

*) $c_{15\,min}$ instead of $c_{5\,min}$;

The invention claimed is:

1. A silicon titanium mixed oxide powder comprising primary particles, wherein the powder has the following features:
   a BET surface area of 5 to 300 m²/g,
   a silica content, based on the total amount of the mixed oxide powder, of ≧0.1 to <0.5% by weight,
   a titanium dioxide content, based on the total amount of the mixed oxide powder, of ≧99.0% by weight,
   a sum of the proportions of silica and titanium dioxide, based on the total amount of the mixed oxide powder, of ≧99.5% by weight,
   the titanium dioxide content of the primary particles comprises intergrown rutile and anatase phases, and
   the silica content of the primary particles is amorphous, and
   the mixed oxide particles comprise a titania core and a silica coating.

2. The silicon/titanium mixed oxide powder according to claim 1, wherein the BET surface area is 30 to 120 m²/g.

3. The silicon titanium mixed oxide powder according to claim 1, wherein the rutile/anatase ratio is 30:70 to 5:95.

4. A process for the preparation of the silicon titanium mixed oxide powder according to claim 1, wherein the vapours of one or more, in each case oxidizable and/or hydrolyzable titanium and silicon compounds, corresponding to a proportion of silica of ≧0.1 to <0.5% by weight and of titanium dioxide of ≧99.0% by weight, based in each case on the total amount of the mixed oxide powder, are transferred, separately or together, into a mixing chamber and then allowed to react in a reaction space in a high temperature zone with oxygen and/or steam, the reaction mixture is cooled after the reaction and the pulverulent solid is separated off from gaseous substances.

5. The process according to claim 4, wherein the high temperature zone is a flame formed by reaction of a gas comprising oxygen with a combustion gas comprising hydrogen.

6. The process according to claim 5, wherein the composition of the flame is chosen so that the high temperature zone has a temperature of 900 to 1600 K.

7. The process according to claim 5, wherein the titanium compound is titanium tetrachloride.

8. The process according to claim 5, wherein the silicon compound is silicon tetrachloride.

9. The process according to claim 5, wherein the titanium compound and the silicon compound are vaporized at temperatures of 200° C. or less, the vapours are mixed with a combustion gas comprising hydrogen and air or oxygen-enriched air and the mixture is ignited and allowed to burn into a reaction space.

10. The process according to claim 5, wherein the silicon compound is at least one selected from the group consisting of $CH_3SiCl_3$, $(CH_3)_2SiCl_2$, $(CH_3)SiCl$, $(CH_3)_4Si$, $HSiCl_3$, $(CH_3)_2HSiCl$, $CH_3C_2H_5SiCl_2$, and $SiCl_4$.

11. A dispersion comprising the silicon titanium mixed oxide powder according to claim 1.

12. A method of conducting a photocatalytic reaction, the method comprising conducting the reaction with a photocatalyst comprising the dispersion of claim 11.

13. A coated substrate comprising the silicon titanium mixed oxide powder according to claim 1 as a coating or coating constituent.

14. A method of conducting a photocatalytic reaction, the method comprising conducting the reaction with a photocatalyst comprising the coated substrate of claim 13.

15. A method of conducting a photocatalytic reaction, the method comprising conducting the reaction with a photocatalyst comprising the powder of claim 1.

16. The silicon titanium mixed oxide powder according to claim 1, wherein anatase is the main component of the rutile and anatase phases.

17. A silicon titanium mixed oxide powder comprising primary particles, wherein the powder has the following features:
- a BET surface area of 5 to 300 m²/g,
- a silica content, based on the total amount of the mixed oxide powder, of $\geq 0.1$ to $<0.5\%$ by weight,
- a titanium dioxide content, based on the total amount of the mixed oxide powder, of $\geq 99.0\%$ by weight,
- a sum of the proportions of silica and titanium dioxide, based on the total amount of the mixed oxide powder, of $\geq 99.5\%$ by weight,
- the titanium dioxide content of the primary particles comprises intergrown rutile and anatase phases, and
- the silica content of the primary particles is amorphous, and
- the rutile/anatase ratio is 30:70 to 5:95.

18. A dispersion comprising the silicon titanium mixed oxide powder according to claim 17.

19. A coated substrate comprising the silicon titanium mixed oxide powder according to claim 17 as a coating or coating constituent.

20. A method of conducting a photocatalytic reaction, the method comprising conducting the reaction with a photocatalyst comprising the powder of claim 17.

* * * * *